Figure 1:
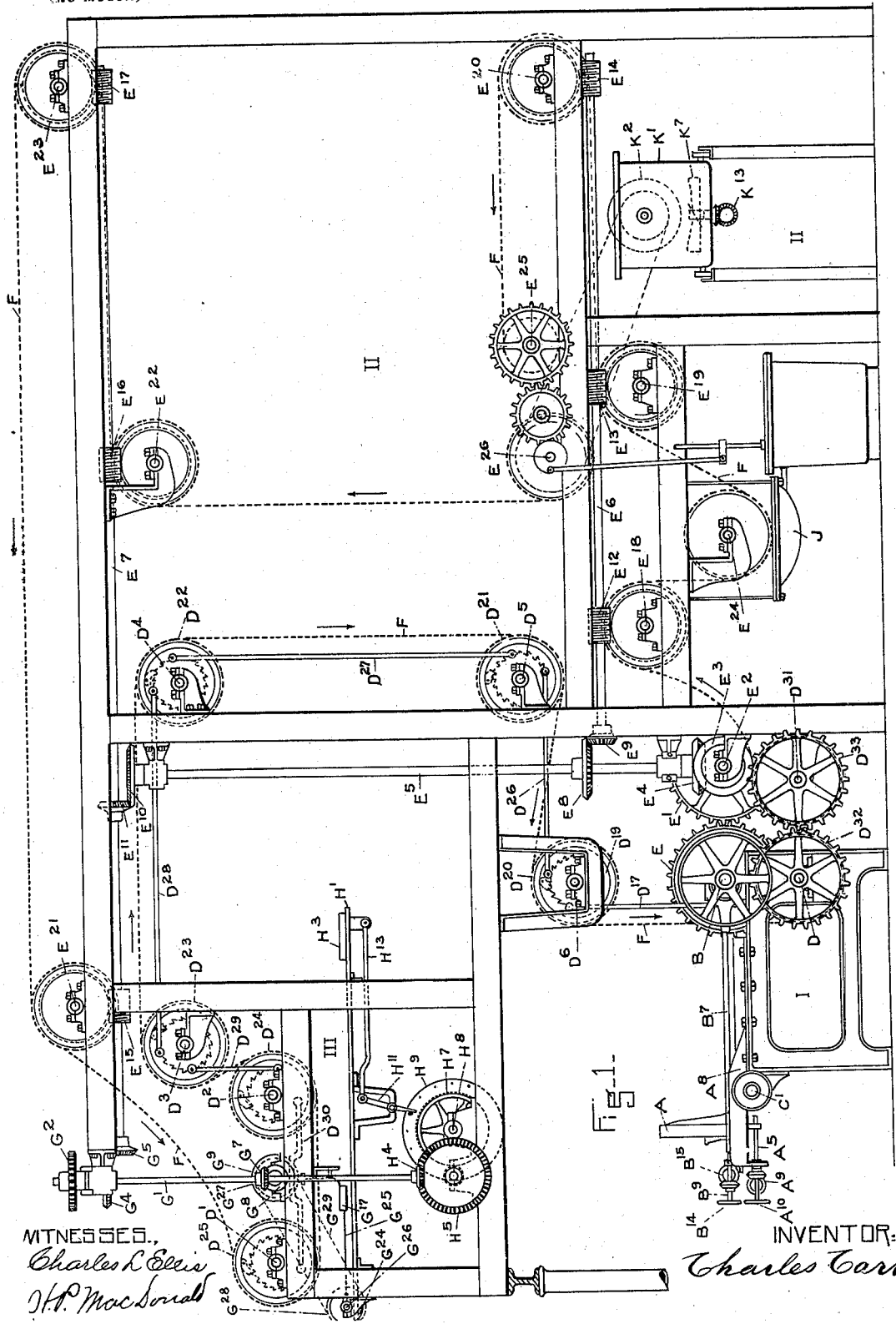

No. 639,359. Patented Dec. 19, 1899.
C. CARR.
MACHINE FOR MAKING AND BOXING MATCHES.
(Application filed June 8, 1899.)
(No Model.) 10 Sheets—Sheet 1.

WITNESSES.
Charles L. Ellis
H. P. MacDonald

INVENTOR:
Charles Carr

No. 639,359. Patented Dec. 19, 1899.
C. CARR.
MACHINE FOR MAKING AND BOXING MATCHES.
(Application filed June 8, 1899.)
(No Model.) 10 Sheets—Sheet 2.

WITNESSES,
Charles L Ellis
H.P. MacDonald

INVENTOR
Charles Carr

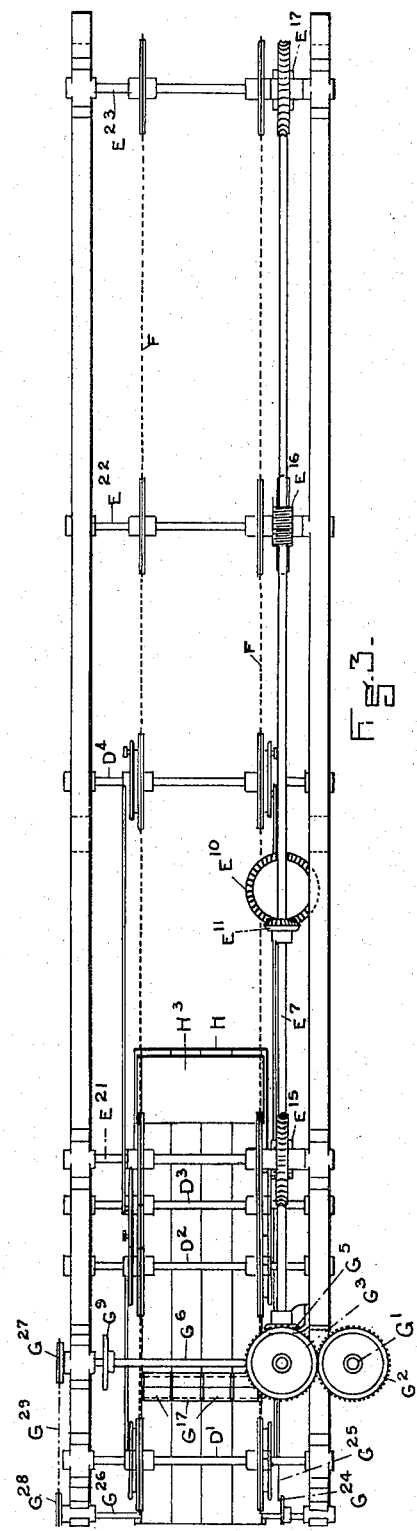

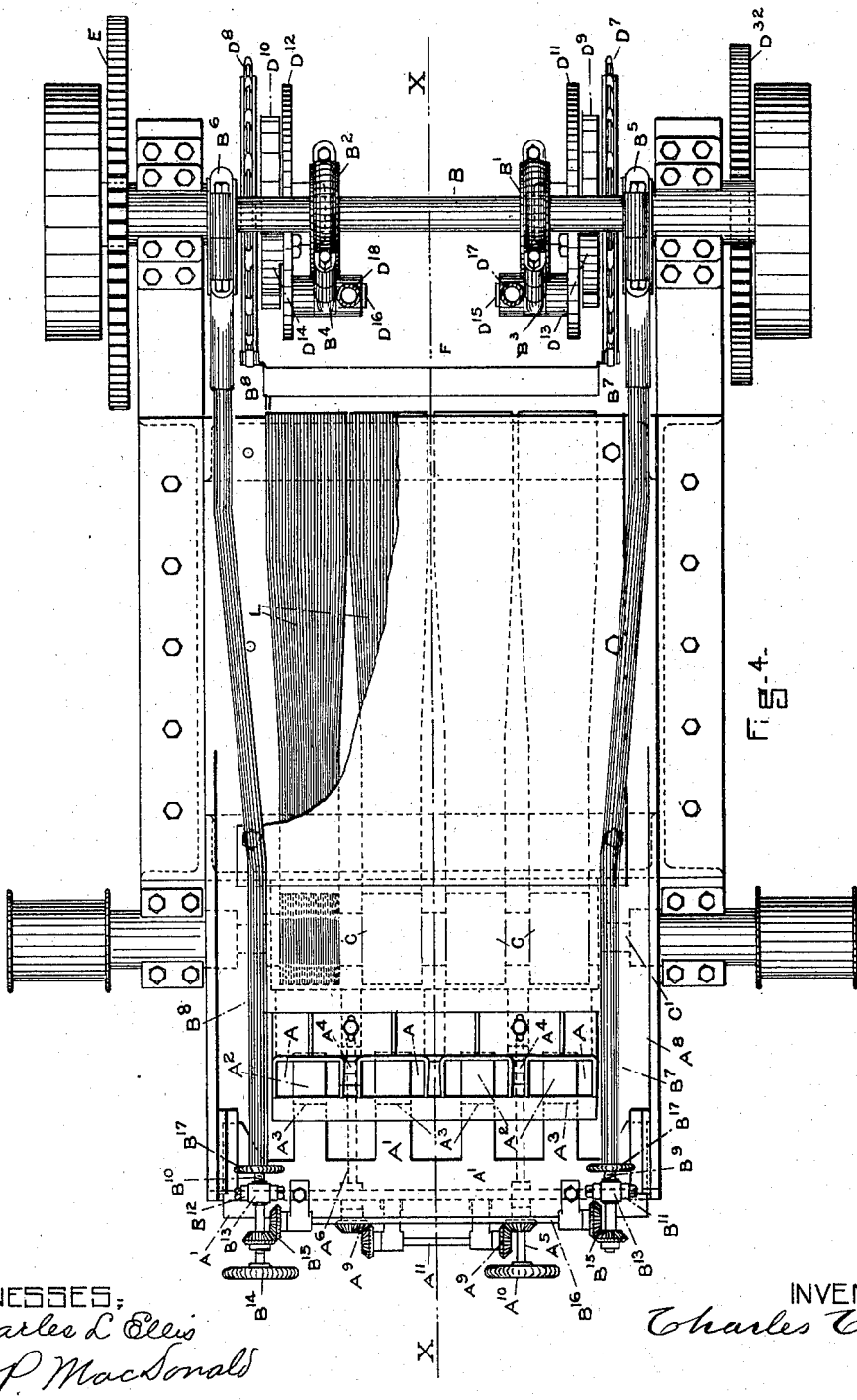

No. 639,359. Patented Dec. 19, 1899.
C. CARR.
MACHINE FOR MAKING AND BOXING MATCHES.
(Application filed June 8, 1899.)
(No Model.) 10 Sheets—Sheet 5.
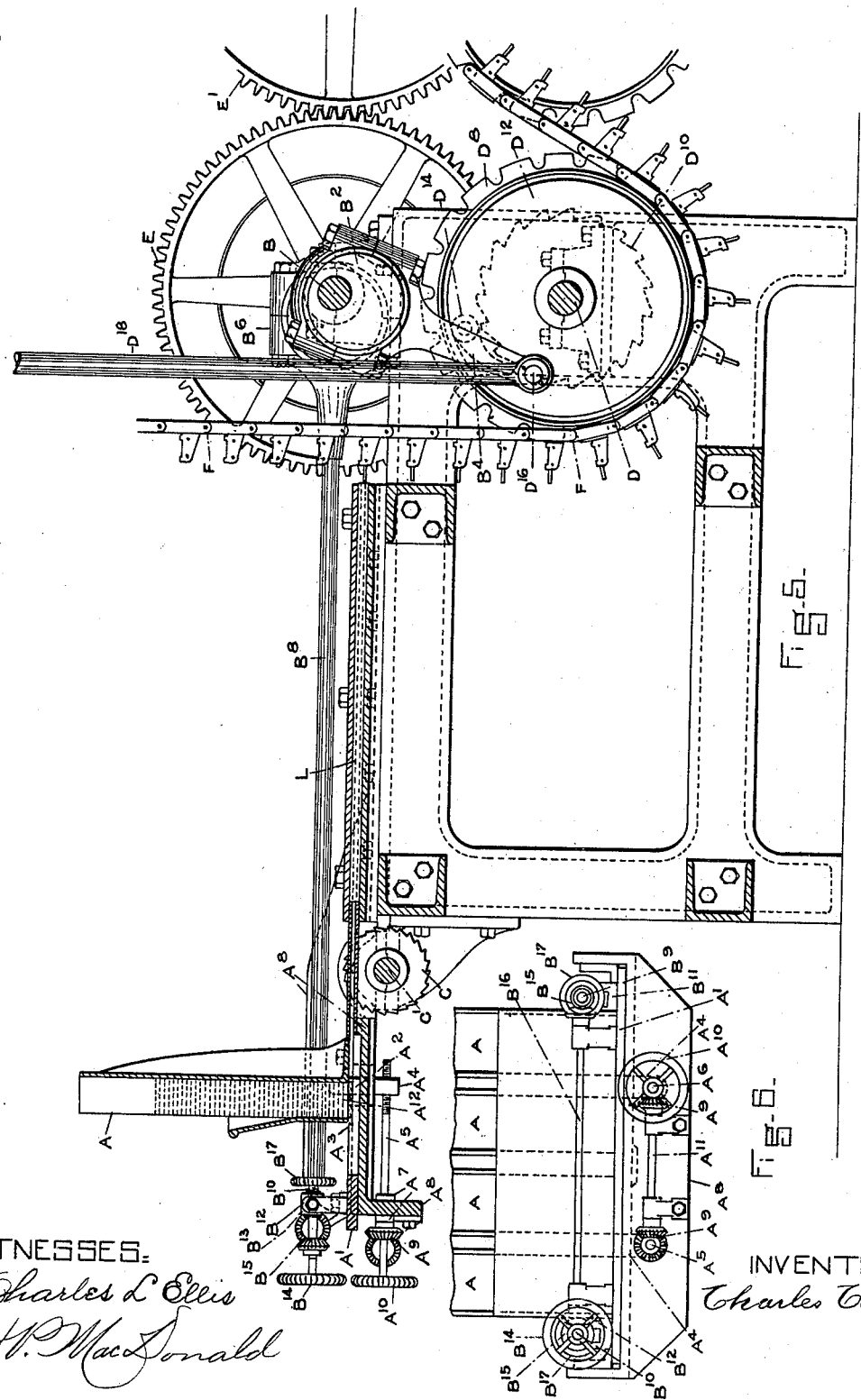
WITNESSES:
Charles L Ellis
J. H. MacDonald
INVENTOR:
Charles Carr No. 639,359. Patented Dec. 19, 1899.
C. CARR.
MACHINE FOR MAKING AND BOXING MATCHES.
(Application filed June 8, 1899.)
(No Model.) 10 Sheets—Sheet 6.

WITNESSES:
Charles L. Ellis
H. P. MacDonald

INVENTOR:
Charles Carr

No. 639,359. Patented Dec. 19, 1899.
C. CARR.
MACHINE FOR MAKING AND BOXING MATCHES.
(Application filed June 8, 1899.)
(No Model.) 10 Sheets—Sheet 7.
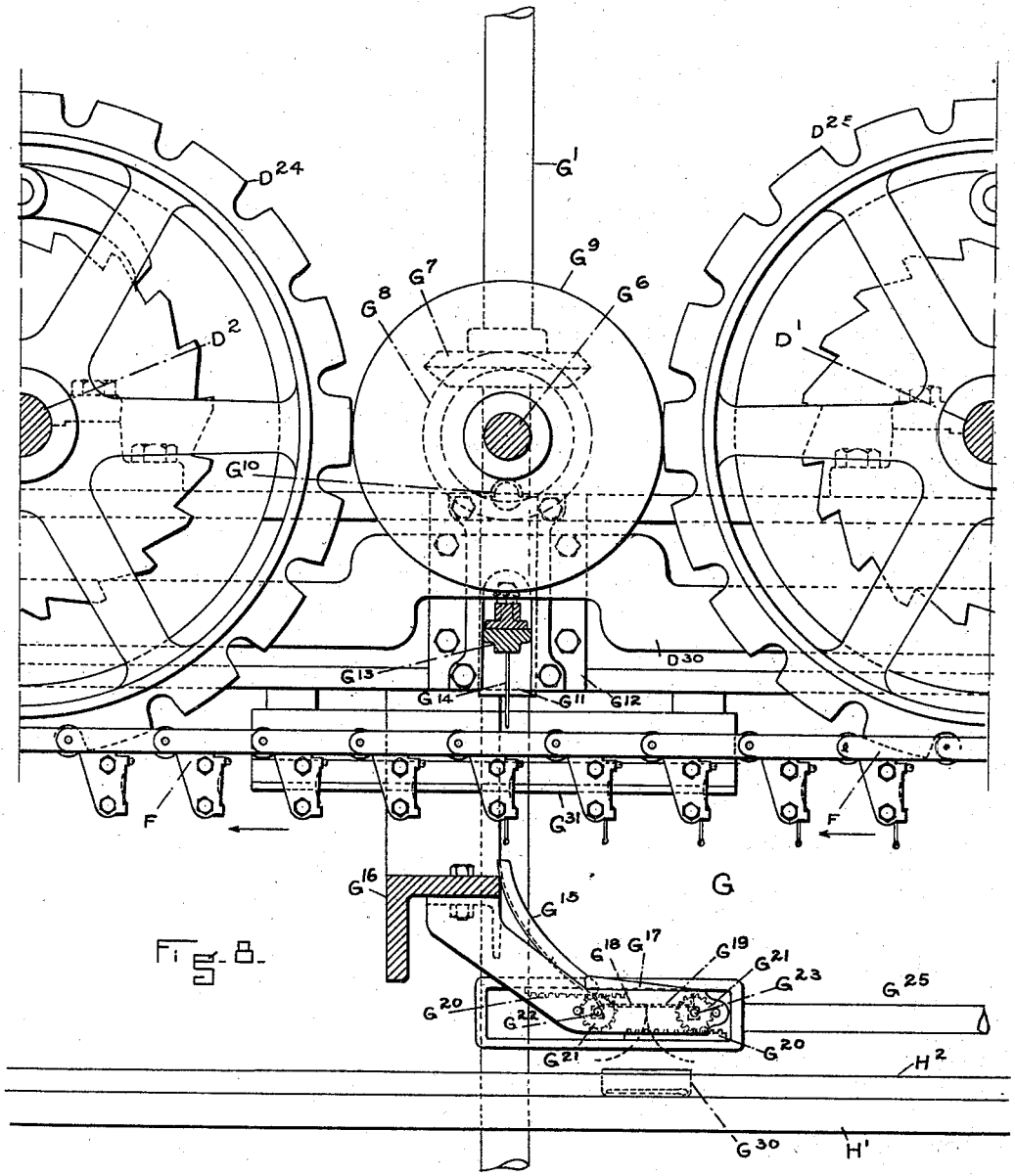
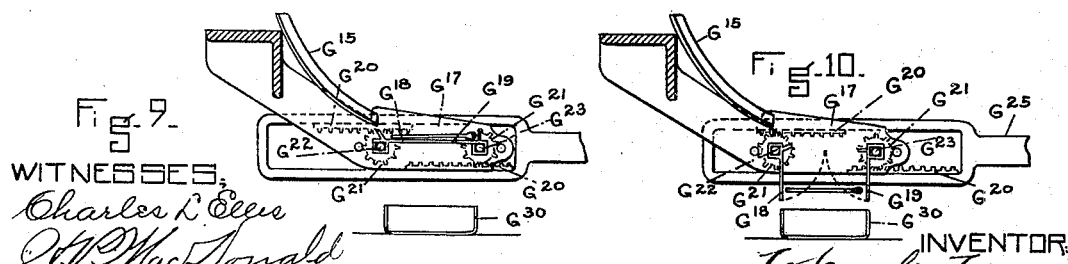

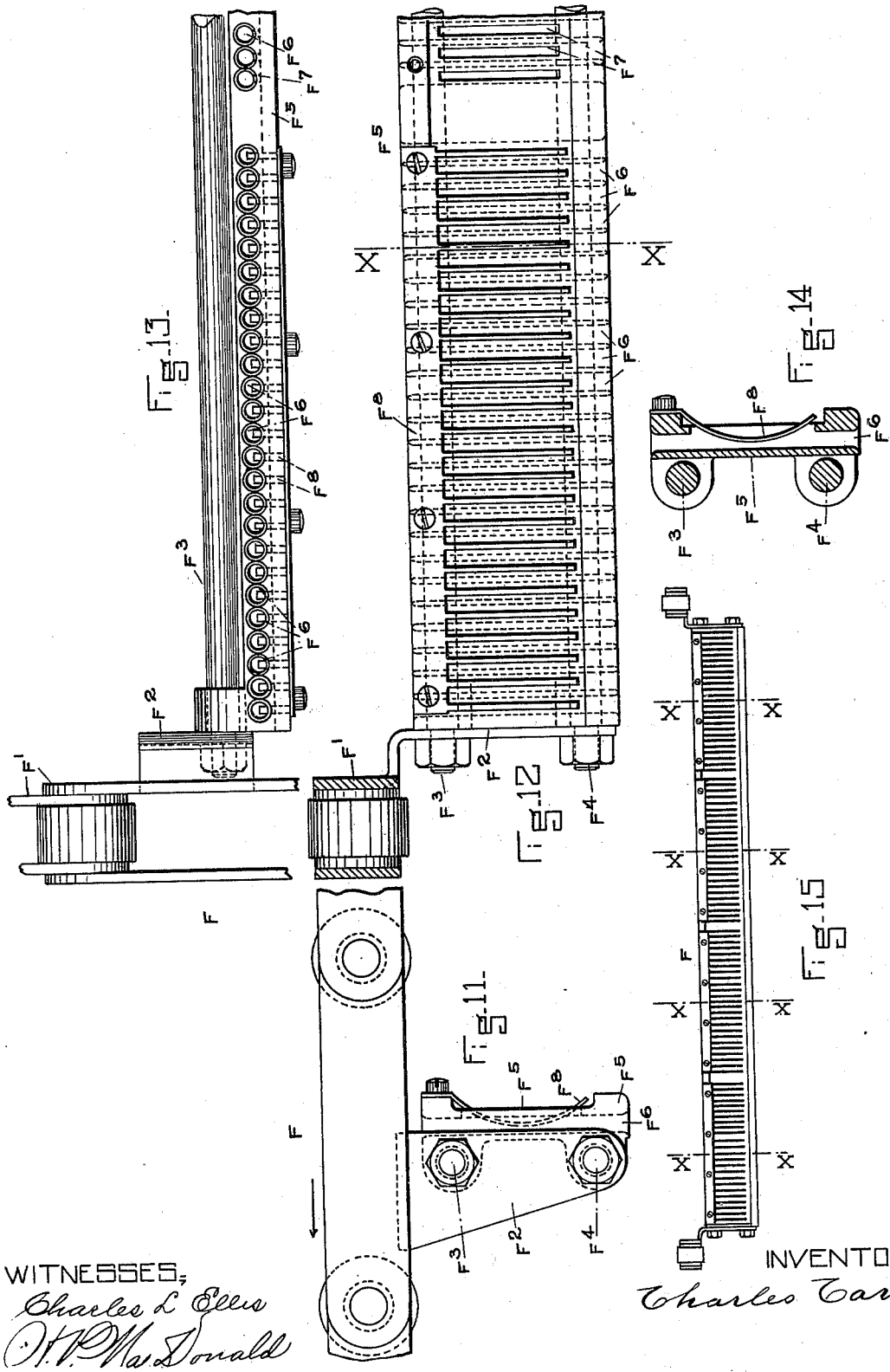

No. 639,359. Patented Dec. 19, 1899.
C. CARR.
MACHINE FOR MAKING AND BOXING MATCHES.
(Application filed June 8, 1899.)
(No Model.) 10 Sheets—Sheet 9.
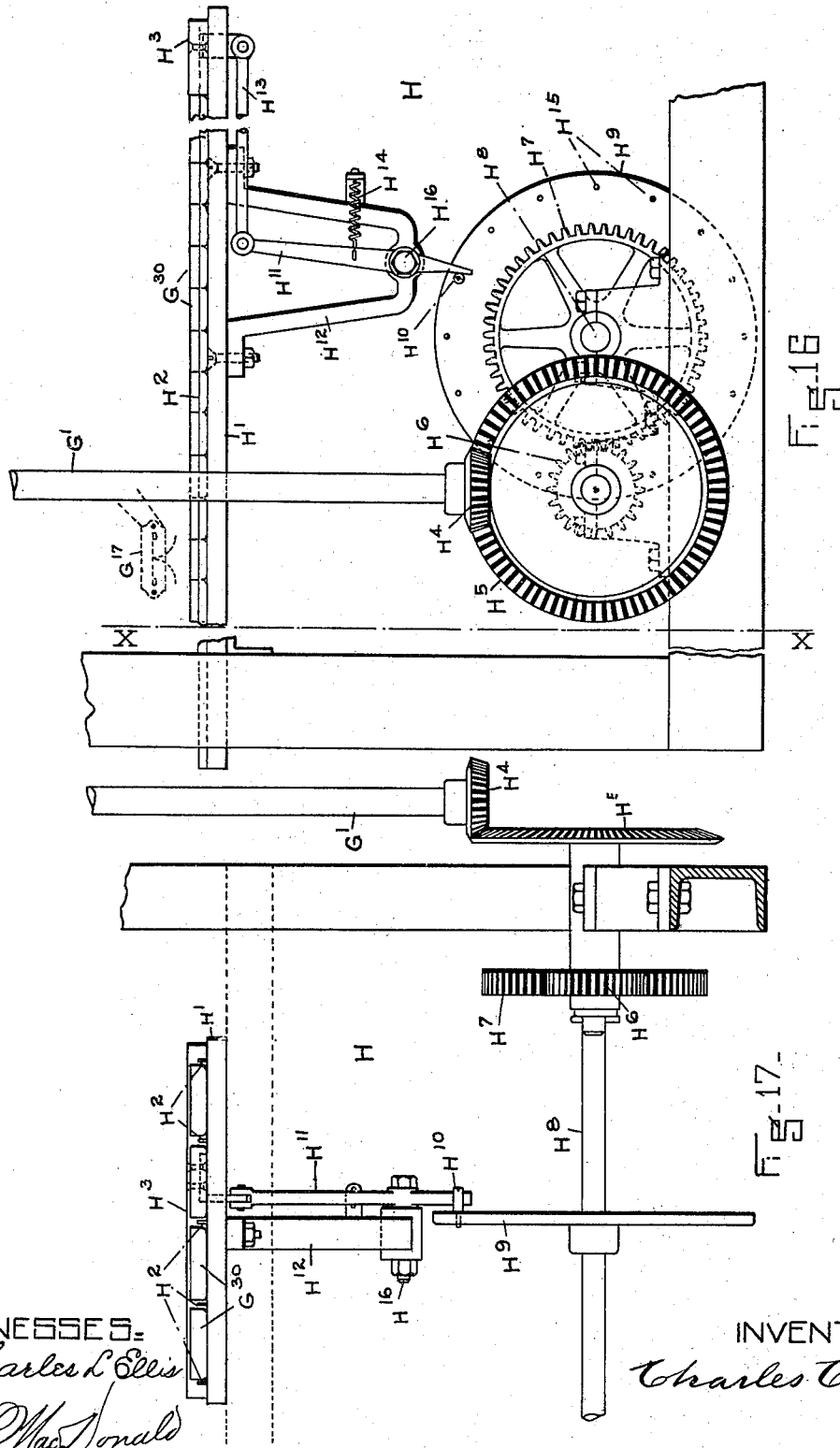
WITNESSES:
Charles L. Ellis
O. P. MacDonald
INVENTOR:
Charles Carr

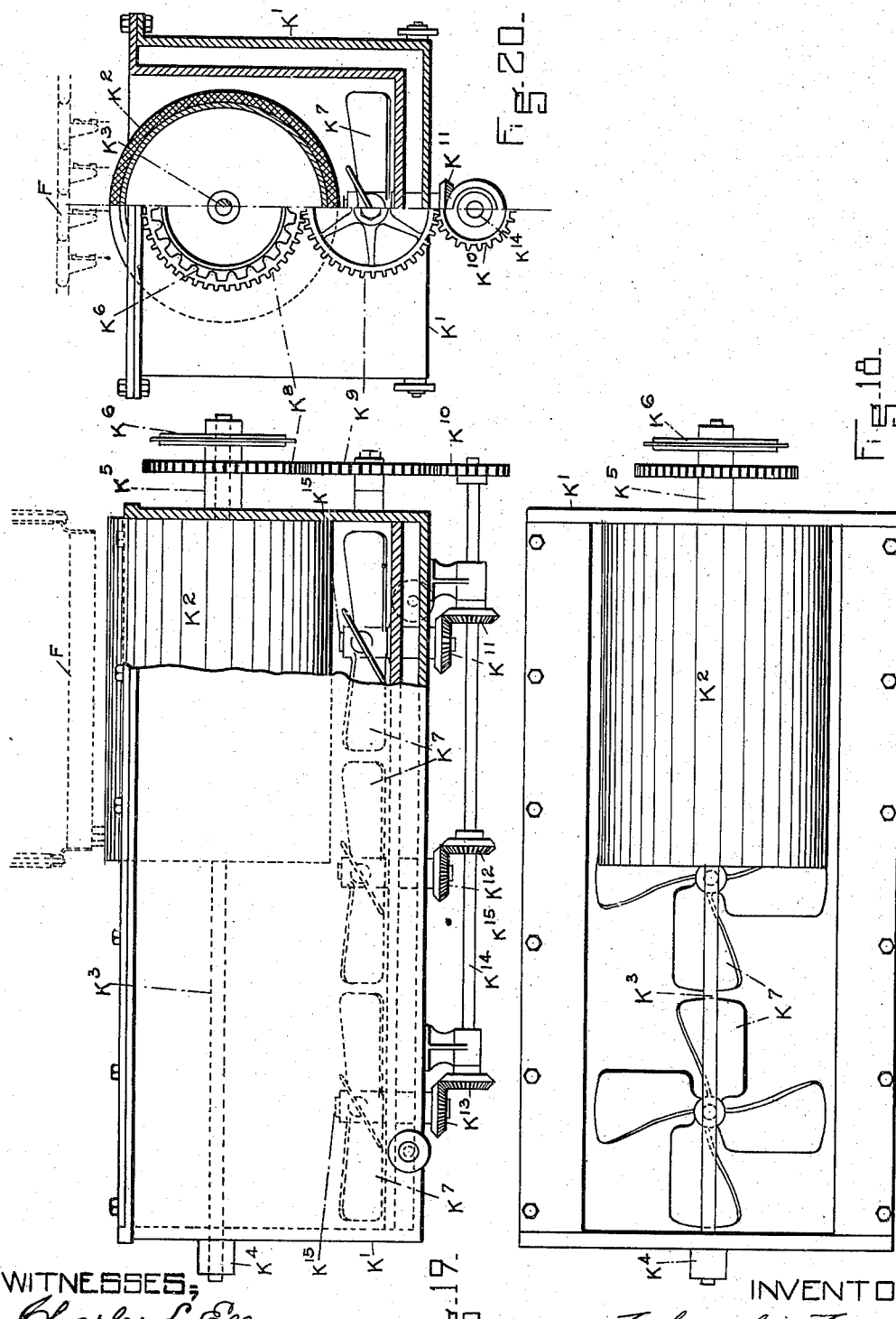

UNITED STATES PATENT OFFICE.

CHARLES CARR, OF BOSTON, MASSACHUSETTS.

MACHINE FOR MAKING AND BOXING MATCHES.

SPECIFICATION forming part of Letters Patent No. 639,359, dated December 19, 1899.

Application filed June 8, 1899. Serial No. 719,792. (No model.)

*To all whom it may concern:*

Be it known that I, CHARLES CARR, a citizen of the United States, residing in the city of Boston, county of Suffolk, and State of Massachusetts, have invented a Machine for Making and Boxing Matches; and I do hereby declare that the following is a full, clear, and exact description of the same, reference being had to the accompanying drawings, forming a part of this specification.

The object I have in view in this invention is to produce a machine more simple in its construction and in its details and with less liability to disarrangement than has heretofore been done.

To this end my invention consists, first, in a simple and more efficient way to regulate the distance between the match-blank hoppers and the match-conveyer chain to provide for any inaccuracies in the lengths of the match-blanks; second, in a more simple and efficient construction of the match-conveyer chain; third, in a more efficient and positive method of ejecting the matches from the match-conveyer; fourth, a simple and more efficient means of feeding the match-boxes to be filled and of delivering the filled boxes to a position for packing; fifth, a simpler and more accurate means of delivering a predetermined number of matches to each match-box as may be desired; sixth, a simple and better location of the sprocket-wheels adjacent to the boxing mechanism to enable the operators to place the boxes to be filled in proper position, and, seventh, a more certain and efficient means for mixing and agitating the igniting-mixture ingredients.

In consists also in the proper relation to the before-mentioned parts each with the other and with other specific parts, which will be hereinafter described.

Figure 2:
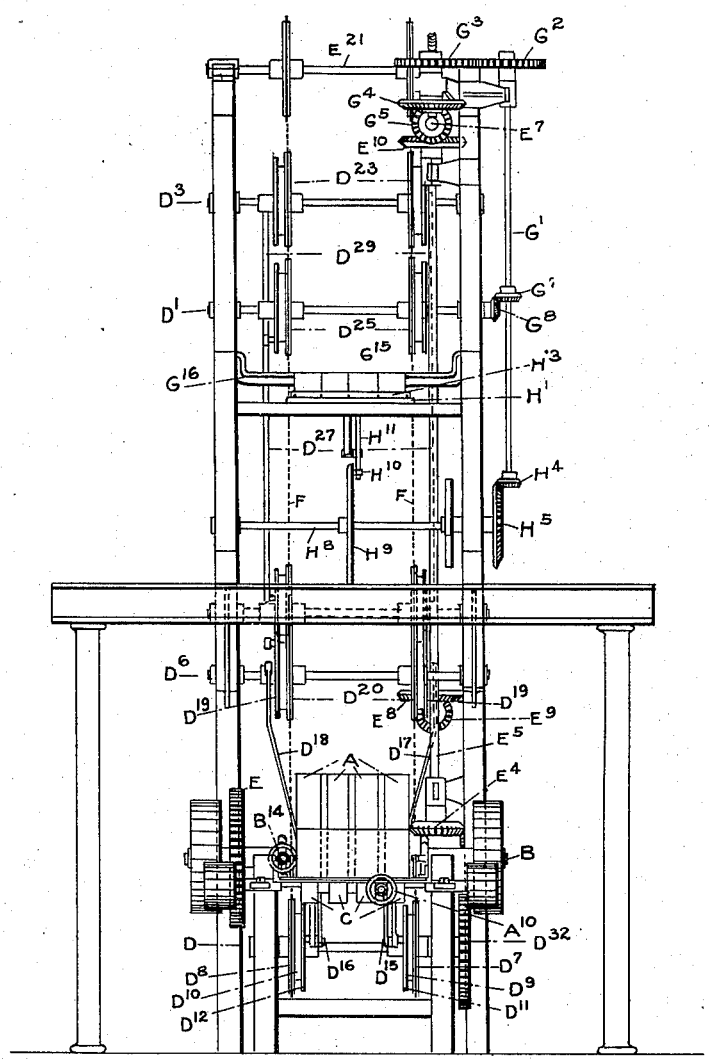
Figure 7:
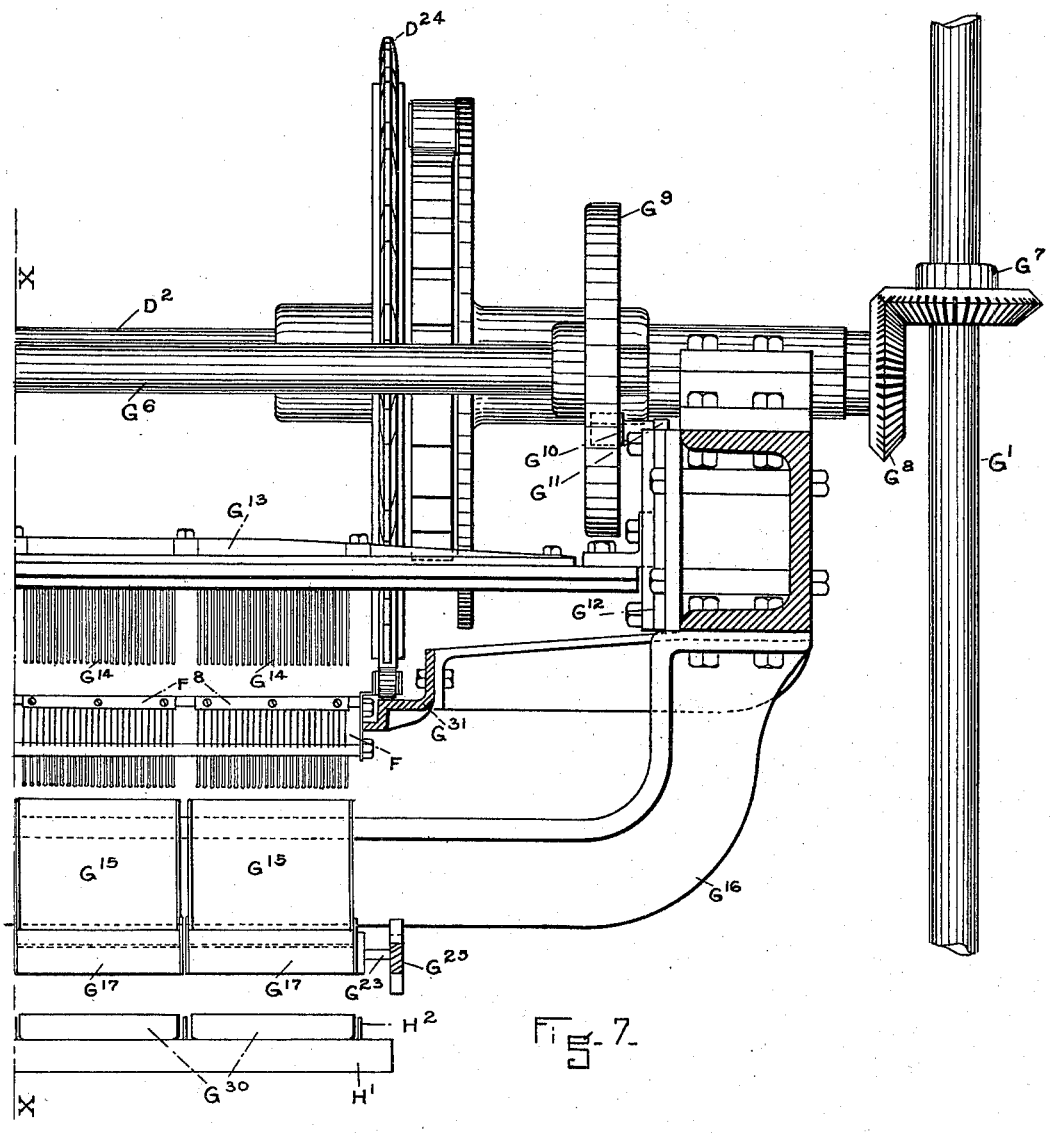

In the drawings, Figure 1 is a side elevation of the entire machine, showing the splint-forming, dipping, drying, and boxing sections in their general relation to each other. Fig. 2 is an end elevation of the same viewed from the left of Fig. 1 and shows in part the boxing mechanism and the splint-forming mechanism. Fig. 3 is a plan of the upper portion of Fig. 1. Fig. 4 is a plan of the splint-forming section of the machine on larger scale, showing the machine-frame, the main driving-shaft, with its driving-pulleys, the eccentrics for driving the intermittent match-conveyer sprocket-wheels, the eccentrics for driving the adjustable side rods, the mechanism for adjusting the length of the side rods, the adjustable match-blank-feeding platen, the adjustable match-blank hoppers, the mechanism for adjusting the hoppers, the saws, saw-arbor and its driving-pulleys, the diverging tubes between saws and conveyer, the cover-plate, shown broken to make drawing clear, and the sprocket-wheels, ratchet-wheels, and pawl-carrying disks secured to a shaft beneath the main shaft. Fig. 5 is a sectional side elevation of Fig. 4 on line X X and shows on the left the adjustable match-blank-feeding platen attached to the adjustable connecting side rods, with the gears, screws, and wheels for accomplishing the adjustment, an adjustable match-blank hopper and its adjusting device, the saw-arbor, with saws mounted thereon, the passage-way through saws and tubes from the hoppers to the match-conveyer, the side-rod eccentrics, the intermittently-operated sprocket-wheels and driving arrangement, the vertical connecting-rods, and the gear for driving the constantly-moving sprocket-wheels. Fig. 6 is a part end elevation of Figs. 4 and 5 of that portion to the left of the saws and shows the adjusting mechanisms for the hoppers and side rods. Fig. 7 is a half-front elevation, on a larger scale, of the mechanism for driving the completed matches from the conveyer onto the match-receiving trays and corresponds to end elevation Fig. 2. This view shows the right-hand half, with the bevel-gears for turning the cams, the cam-roll, the guide, the ejector-bar, with connections to the cam-roll, two groups of ejectors, two groups of matches in the conveyer, two chutes and two match-receiving trays attached to cross-bar, one-half of match-box table, with its guides and with boxes thereon, a sprocket-wheel, ratchet-wheel, and disk with pawl for purpose of moving conveyer intermittently. Fig. 8 shows the same, on like scale, in side central sectional elevation, viewed from the left in Fig. 6, or from farther side, as shown in Fig. 1. The ejector-bar and cross-bar are shown in section and the conveyer is shown with matches up to point where ejectors drop to push them out. Fig. 9 is a detail of the chutes and match-trays in section, with a match on the flaps and a box beneath on the table ready to receive matches. Fig. 10 is a similar view with flaps down and shows the match dropping toward the box. Fig. 11 shows in side elevation one link of the conveyer-chain, the match-splint-receiving holder, its supporting-rods, and the splint-grasping springs. Fig. 12 is an elevation at right angles to Fig. 11 and shows one of the sprocket-chains in end elevation, the depending arm of the inner link, and one group of twenty-five holes, each with its springs, and also three holes without springs, but showing slits through which the springs project. Fig. 13 is a plan of Fig. 12. Fig. 14 is a section at line X X of Fig. 12. Fig. 15 shows the entire width of the conveyer-chain on smaller scale. The center of the holder groups are at lines $x$ $x$. Each group shows twenty-five individual match-grasping springs. Fig. 16 is a part elevation, on larger scale, of the box-feeding device as shown in Fig. 1 and consists of bevel and spur gears, an index-wheel, rocking arm attached by connecting-rod to the push-bar, and the table with guide-strips for boxes. Fig. 17 is a view of the same parts, taken at line $x$ $x$, it being understood that the machine-frame, pedestal, &c., for supporting these parts on the left are omitted in this drawing. Fig. 18 is a plan of the igniting-mixture tank, with mixture-applying roll and the screw-propellers for agitating the mixture. Fig. 19 is a broken front elevation of the same, showing the mixture-carrying roll, the screw-propellers, and their relation to each other, and the means for revolving the propellers through spur and bevel gears. Fig. 20 is an end view, half in elevation and half in section, of the parts shown in Fig. 19.

In the following description of the construction and operation of the machine I will designate as "match-blanks" the rectangular sections of wood or other suitable material which are supplied to the machine, and which blanks after passing through the saws or other dividers become match-splints, and which splints after passing through the dipping and drying sections of the machine become completed matches.

*General description of operation, Figs. 1, 2, and 3.*—In the splint-forming section of the machine, section I, Fig. 1, is shown on the left, the end one, of a row of four adjustable hoppers A, in which are piled the match-blanks previously prepared and which blanks have been shaped to the required length and thickness of the proposed match and wide enough to make the requisite number of matches when divided into splints.

By the automatic movement of the various mechanisms of the machine, all of which except the saws C are actuated by the main shaft B, and which automatic mechanism will hereinafter be more minutely described, the match-blanks are intermittently and separately pushed from the receiving-hoppers A onto and past gangs of saws C on arbor C' or other effective dividers and as separated match-splints through suitable guideways into the main conveyer F. These guideways or tubes L are of the same section as the proposed match and diverge at the end farthest from the saws for the purpose of delivering them to the match-conveyer chain, with space enough between them to be dipped without the liability of their adhering together.

The conveyer F is constructed in part of endless sprocket-chains and is indicated in Fig. 1 by a heavy dotted line. The conveyer travels, carrying its load of match-splints, in the direction shown by the arrows, around and over various sprocket-wheels to the paraffin-tank J and the igniting-mixture tank K' in the dipping and drying sections of the machine, II, and thus onward, as may be traced by the arrows, through a sufficient distance for the dipped ends to become dry, to the boxing-section III, where the completed matches are discharged into the match-boxes $G^{30}$, ready for sale, in such a number to each box as may be predetermined and automatically provided for. The match-boxes are brought into proper position to be filled by mechanism hereinafter to be described.

The movement of the match-conveyer F is intermittent through that part of its circuit where it receives its load of match-splints, section I, and again where it discharges its load of completed matches, section III, the conveyer being at rest at the instant when receiving and also when discharging its load. While passing through the dipping and drying section of the machine, II, the movement of the conveyer is preferably constant and uniform.

The sprocket-wheels $D^{25}$, $D^{23}$, $D^{24}$, $D^{22}$, $D^{21}$, $D^{20}$, $D^7$, and $D^8$, keyed to the shafts $D'$, $D^2$, $D^3$, $D^4$, $D^5$, $D^6$, and D, Figs. 1 and 2, are all driven in an intermittent movement by eccentrics and connections from the main shaft B. In like manner all the sprocket-wheels which drive and carry the conveyer F can be driven, if so desired. To accomplish this forward movement of the sprocket-wheels in an intermittent or tooth-by-tooth movement, eccentrics $B'$ and $B^2$ on the main shaft B are connected by eccentric arms $B^3$ and $B^4$ and studs $D^{15}$ and $D^{16}$ to disks $D^{11}$ and $D^{12}$, carrying pawls $D^{13}$ and $D^{14}$. At each revolution of the main shaft the disks oscillate on the shaft D, the pawls $D^{13}$ and $D^{14}$ each engaging with a tooth of each of the ratchet-wheels $D^9$ and $D^{10}$, driving them forward one tooth. These ratchet-wheels are secured to sprocket-wheels $D^7$ and $D^8$, keyed to the shaft D, all of which move in unison.

Secured to the studs $D^{15}$ and $D^{16}$ in the oscillating disks $D^{11}$ and $D^{12}$ are the connecting-rods $D^{17}$ and $D^{18}$, which give to the disks $D^{19}$ on shaft $D^6$ an oscillating movement equal and similar to that of the disks $D^{11}$ and $D^{12}$ on shaft D. The disks $D^{19}$ carry pawls which operate similar to pawls $D^{13}$ and $D^{14}$ on ratchet-wheels connected to sprocket-wheels $D^{20}$ on shaft $D^6$, moving them at the same time and in the same direction. In like manner the sprocket-wheels $D^{21}$, $D^{22}$, $D^{23}$, $D^{24}$, and $D^{25}$ on shafts $D^5$, $D^4$, $D^3$, $D^2$, and $D'$ are moved by the connecting-rods $D^{26}$, $D^{27}$, $D^{28}$, $D^{29}$, and $D^{30}$, respectively, all at the same time and in equal and regular movement. As the action of the pawls on the ratchet-wheels is intermittent, the movement of the sprocket-wheels secured to shafts $D'$, $D^2$, $D^3$, $D^4$, $D^5$, $D^6$, and $D$ is also intermittent, as also is that section of the conveyer F which in its circuit is carried by these sprocket-wheels. The shaft $D^{31}$, carrying sprocket-wheels for driving the conveyer F, is also driven intermittently by the gear $D^{32}$, secured to the shaft D, which engages with a similar gear $D^{33}$ on shaft $D^{31}$. The arrangement and location of these intermittently-moved sprocket-wheels, as shown, is necessary for the proper operation of the machine.

Shafts $D'$ and $D^2$, horizontal to each other, must necessarily be placed in close proximity to the table $H'$ for the purpose of ejecting matches from the conveyer into the boxes on the table $H'$. Shafts $D^3$ and $D^4$ are elevated to give head-room for the operators who feed or place the boxes on table $H'$. The sprocket-wheel shafts $D^5$ and $D^6$ are located, as shown, to prevent any racing of the chain at the point where the match-splints are pushed from the tubes. The racing of the chain is due to long heavy perpendicular lengths. The change in the movement of the conveyer from an intermittent movement of equal and regular pulsations to a constant movement is effected by means of spur, bevel, and worm gears (shown in Figs. 1, 2, and 3) as follows: By the main shaft B is revolved the spur-gear E, driving a similar spur-gear $E'$ on shaft $E^2$, on which shaft is the bevel-gear $E^3$, driving the vertical shaft $E^5$ by means of the bevel-gear $E^4$. This vertical shaft $E^5$ actuates the horizontal shafts $E^6$ and $E^7$ through bevel-gears $E^8$ and $E^{10}$ and pinions $E^9$ and $E^{11}$. On these horizontal shafts $E^6$ and $E^7$ are the worms $E^{12}$, $E^{13}$, $E^{14}$, $E^{15}$, $E^{16}$, and $E^{17}$, driving worm-gears secured to the shafts $E^{18}$, $E^{19}$, $E^{20}$, $E^{21}$, $E^{22}$, and $E^{23}$, to which are secured the sprocket-wheels which carry the conveyer F. The shafts $E^{24}$, $E^{25}$, and $E^{26}$, carrying sprocket-wheels, are idler-shafts and derive their movement from the conveyer-chain F, which travels on them. As the main shaft B revolves constantly and uniformly, it will be seen that the sprocket-wheels mounted on shafts $E^{18}$, $E^{24}$, $E^{19}$, $E^{20}$, $E^{25}$, $E^{26}$, $E^{22}$, $E^{23}$, and $E^{21}$ revolve in the same manner, and that the section of the conveyer F which is carried by the sprocket-wheels mounted on these shafts is constant and uniform in movement.

The conveyer F is so mounted on the sprocket-wheels that the sections between sprocket-wheels on shafts $E^{21}$ and $D'$ above and $D^{31}$ and $E^{18}$ below are sufficiently slack to allow an equalization of the two movements of the conveyer, the sag in the chain varying intermittently. This equalization is effected by adjusting the mechanism described in such a manner that while all the sprocket-wheels make a full revolution in the same period of time the intermittently-moved sprocket-wheels are at rest during the time required for the constantly-moved sprocket-wheels to move a distance equal to half the length of a link of the conveyer-chain. Then the intermittently-moved sprocket-wheels are driven forward by their pawls and ratchets at double speed, making up the lost time, and thereby equalizing the movement of the conveyer. It is during the intervals of rest that the match-splints are pushed into the conveyer, as hereinafter more particularly described. The sprocket-wheels on shafts $E^{18}$, $E^{24}$, $E^{19}$, $E^{20}$, $E^{25}$, $E^{26}$, $E^{22}$, $E^{23}$, and $E^{21}$, which carry the conveyer through the dipping and drying sections of the machine, are located with particular reference to the processes to which the match-splints and matches are subjected. Through this dipping and drying section the conveyer is carried onward in a constant even movement. This device for moving the conveyer F is claimed in application Serial No. 691,092.

*The adjustable hoppers and coöperating parts, Figs. 1, 2, 4, 5, and 6.*—The adjustable hoppers A, any desirable number of which may be used, (there are four in the machine being described,) are of rectangular sections and of the proper dimensions to hold a number of match-blanks $A^{12}$ in the required position and are constructed without top or bottom, the match-blank being supported on projections $A^2$, which are a part of the adjustable feed-platen $A'$. (See Figs. 4 and 5.) This platen extends across the full width of the machine and is driven forward and backward under the hoppers by the adjustable reciprocating side rods $B^7$ and $B^8$, which are attached to opposite ends of the platen $A'$, one on either side of the machine. The side rods $B^7$ and $B^8$ are actuated by the eccentrics $B^5$ and $B^6$ on the main driving-shaft B, Figs. 1, 4, and 5, and their reciprocating movement is identical in time with other intermittently-moved parts of the machine. The adjustable platen $A'$ is provided with projections $A^2$, the upper surfaces of which are approximately lower by the thickness of a match-blank than the upper surface of the platen $A'$. At the point where the projections $A^2$ meet the raised portion of the platen $A'$ the edge so formed is beveled back on the under side, and it is this beveled edge $A^3$ which engages the exposed end of the undermost match-blank in the hopper and pushes the blank toward the saws, which are arranged as near the hoppers as practicable in gangs of any required number; but in this machine are four (4) gangs of twenty-six saws each.

The movement which the platen receives through the side rods is somewhat greater than the length of a match-blank to allow the card to freely drop on platen projections $A^2$, its forward movement, as has been stated, pushing a match-blank toward the saws. In Figs. 4 and 5 the platen is shown in its extreme backward position, and in Fig. 5 a match-blank $A^{12}$, the undermost one in the hopper A, rests upon the projections $A^2$ of the match-feeding platen, ready to be pushed by the beveled edge toward the saws and through the tubes L. The match-blanks $A^{12}$, which when divided and then dipped become matches, are previously prepared and are made as accurately as it is possible. A slight variation in the length of a match-blank is multiplied between the saws and chain as many times as there are blanks between them, and to take care of this variation I have provided the following means of adjusting the hoppers and feeding-platen, which must always remain in the same relation to each other: The hoppers A have at their lower end, Figs. 4, 5, and 6, the lugs $A^4$, which project through slots in the bed-plate of the machine and are threaded to receive the screws $A^5$ and $A^6$, which are kept from advancing when turned by the collars $A^7$ on either side of the downwardly-projecting rib of the machine-bed $A^8$. Screw $A^5$ is longer than screw $A^6$ and is turned by a hand-wheel $A^{10}$ on its outer end. Screw $A^6$ is connected with and turned by screw $A^5$ by the bevel-gears $A^9$ and shaft $A^{11}$.

The hopper is secured to the machine-bed in such a manner that when screws $A^5$ and $A^6$ are turned the hoppers move on the machine-bed longitudinally forward or backward. In a similar way the feeding-platen $A'$ is adjusted through screws $B^9$ and $B^{10}$. The platen $A'$ has at each end the forked lugs $B^{11}$ and $B^{12}$, in which are pivoted the blocks $B^{13}$, bored to receive the screws $B^9$ and $B^{10}$, fitted with collars on both sides of the blocks $B^{13}$. The screws $B^9$ and $B^{10}$ thread into the ends of the side rods $B^7$ and $B^8$ and are provided with check-nuts $B^{17}$ for keeping the parts rigid when set in place. A hand-wheel $B^{14}$ is secured to the outer end of screw $B^{10}$. The screws $B^9$ and $B^{10}$ are connected and turned in conjunction by sets of bevel-gears $B^{15}$, connected by the shaft $B^{16}$.

*Main conveyer, Figs. 1, 4, 5, 7, 8, and particularly 11, 12, 13, 14, and 15.*—The main conveyer F is constructed as follows: Two lines of endless sprocket-chain, parallel to each other, made up of links and rivets on the plan of an ordinary machine-chain, are connected by the rods $F^3$ and $F^4$. The inner links $F'$ of the sprocket-chains are provided with depending arms $F^2$, vertically parallel to each other and connected by the parallel rods $F^3$ and $F^4$ at right angles to depending arms $F^2$. On these rods are suspended and immovably secured between the depending arms $F^2$ the match-splint-receiving holders $F^5$, provided with through-holes $F^6$, into which the match-splints are pushed from the tubes L. These holes extend through the holders $F^5$ parallel to the depending arms $F^2$. Rectangular openings or slits $F^7$ into holes $F^6$ permit the entrance of the convex springs $F^8$, one to each hole, thereby gripping each match-splint firmly by an individual spring. The match-holder $F^5$, suspended on the rods $F^3$ and $F^4$, may be made in one or more sections, as desired.

*Boxing mechanism, Figs. 1, 2, 3, 7, 8, 9, and 10.* — After the matches have passed through the dipping and drying sections of the machine, I I, Fig. 1 they are carried by the conveyer F over sprocket-wheels on shaft $E^{21}$ and around sprocket-wheels on shaft $D'$, between which and shaft $D^2$ is located the boxing mechanism G, constructed as follows: A vertical shaft $G'$ receives motion through bevel and spur gears $G^2$, $G^3$, $G^4$, and $G^5$ from horizontal shaft $E^7$, Figs. 1, 2, and 3, and in turn rotates the cam-shaft $G^6$, Figs. 7 and 8, by the bevel-gears $G^7$ and $G^8$. This shaft $G^6$ carries at either side the cams $G^9$, which, through rolls $G^{10}$ in cam-path, guide bars $G^{11}$, to which rolls $G^{10}$ are secured, and guides $G^{12}$ give to the ejector-bar $G^{13}$ a vertical reciprocating movement. This bar $G^{13}$ carries on its under side ejectors $G^{14}$, so spaced that when the conveyer F stops the ejectors $G^{14}$ in the downward movement of bar $G^{13}$ enter and push out the match-splints from the holes $F^6$, in which they are held by the springs $F^8$. Attached to the machine-framing for the purpose of guiding and supporting the conveyer-chain at the point where matches are ejected are the longitudinal guides $G^{31}$, one on each side of the machine. After leaving the conveyer-holders $F^5$ the matches drop onto the curved chutes $G^{15}$, arranged in a single line at right angles to the match-conveyer and parallel to each other, which are attached to the cross-bar $G^{16}$. This cross-bar, which is secured to the machine-framing at right angles to the travel of the conveyer, also supports the match-trays $G^{17}$ all in a single line and parallel to the cross-bar $G^{16}$. These match trays $G^{17}$ and chutes $G^{15}$ are placed directly beneath the match-group holders of the conveyer. In each tray $G^{17}$ are two hinged flaps $G^{18}$ and $G^{19}$, which when closed form a shelf upon which the matches lie when dropped from the conveyer F through the chutes $G^{15}$, Figs. 7 and 8. The flaps $G^{18}$ and $G^{19}$ in the four trays $G^{17}$ are all opened and closed at the same time by two rods $G^{22}$ and $G^{23}$, to which all the flaps are attached, four to each rod, through pinions $G^{21}$, racks $G^{20}$, reciprocating rod $G^{25}$, and the cam $G^{24}$. The flap-rods $G^{22}$ and $G^{23}$ pass through each of the four trays, and the flaps $G^{18}$ and $G^{19}$ in each tray are secured to them parallel and in alinement, so that the cam $G^{24}$ operates them all at the same time and in the same position. The cam $G^{24}$, secured to the shaft $G^{26}$, is driven by sprocket-wheels $G^{27}$ and $G^{28}$ and chain $G^{29}$. (See Fig. 1.)

The operation of the boxing mechanism above described is as follows: During the interval of rest of the conveyer F the ejector-bar $G^{13}$, containing as many ejectors as there are holes in each match-splint holder, drops through the agency of the cam $G^9$ and at one stroke drives every match out of the holder $F^5$ and immediately ascends to allow the conveyer to move forward another link and present another row of matches, when the operation is repeated. The matches drop from the holders in a straight row and fall upon the chutes $G^{15}$, which guide them upon the flaps $G^{18}$ and $G^{19}$ of the receiving-trays $G^{17}$, where they lie horizontally and evenly in the same relation to each other as when in the chain. The cam $G^{24}$, through-rod $G^{25}$, racks $G^{20}$, and gears $G^{21}$ are so arranged that the moment the matches slide upon the flaps $G^{18}$ and $G^{19}$ the latter instantly swing downward and deposit the matches into the match-box $G^{30}$ underneath in the same order in which they lie upon the flaps when closed.

The box-feeding device, section III, Figs. 1, 16, and 17, is constructed as follows: A table $H'$ has on its upper surface the guide-strips $H^2$ extending its full length and in the same direction as the travel of the match-conveyer F. At the right-hand end, Fig. 16, a push-bar $H^3$ slides back and forth upon the table $H'$, grooves in the push-bar allowing it to travel over the guides $H^2$. This push-bar $H^3$ receives its forward and backward movement from a shaft $G'$ in the following manner: Beveled gears $H^4$ and $H^5$ turn a shaft $H^8$, on which is an index-wheel $H^9$, by means of spur-gears $H^6$ and $H^7$. This index-wheel, which may have teeth or lugs, but in this case is provided with pins, has holes $H^{15}$ equidistant from each other for pins $H^{10}$ to be inserted. These pins strike the rocking arm $H^{11}$ oscillating on pin $H^{16}$ in bracket $H^{12}$. The upper end of rocking-arm $H^{11}$ is secured to one end of a connecting-rod $H^{13}$, the other end of which connects with push-bar $H^3$ through a slot in the table $H'$. Every time a pin strikes the rocking arm $H^{11}$ the push-bar $H^3$ moves forward or to the left. To insure the backward movement, a spring $H^{14}$ or any device for accomplishing the purpose may be used. In operation the match-boxes to be fed forward to be filled are placed upon the table $H'$ between the guide-strips $H^2$ and are pushed forward to a position beneath the trays $G^{17}$ by the push-bar $H^3$. On the return stroke of the push-bar another row of match-boxes are placed upon the table, and the operation is repeated. The match-boxes may receive a greater or less number of matches by changing the number of teeth or pins in the index-wheel $H^9$ as follows: At each revolution of the main shaft B of the match-splint-forming machine, section I, a row of matches is forced by the ejectors $G^{14}$ out of the conveyer F and, dropping upon the flaps $G^{18}$ and $G^{19}$, are deposited by them in the boxes beneath, this row of matches in the machine being described numbers one hundred, divided into four groups of twenty-five matches each. Each tray receives twenty-five matches and delivers them to the box $G^{30}$ beneath at each revolution. A disk $H^9$ makes but one revolution, while the main shaft makes sixteen. If one pin $H^{10}$, as shown in the drawings, is in the disk $H^9$, the push-bar $H^3$, attached to rocking arm $H^{11}$ by the connecting-rod $H^{13}$, is moved forward but once in these sixteen revolutions of the main shaft. As twenty-five matches fall at each revolution sixteen multiplied by twenty-five or four hundred matches fall into each box. If two pins opposite each other were placed in the disk, the push-bar would be moved twice in sixteen revolutions of the main shaft, or the box would stay under the flaps during eight revolutions and would receive eight multiplied by twenty-five or two hundred matches. If two more pins were placed in the disk, making four in all, and equally distant from each other, the feed-bar would move four boxes under the trays during sixteen revolutions, and each would receive four multiplied by twenty-five or one hundred matches. If a pin were placed between each of these four, making eight in all, the feed-bar would move up eight boxes, and each would stay under the tray during two revolutions, receiving twenty-five multiplied by two or fifty matches, and if the disk contained sixteen pins the feed-bar would move a box under the trays at each revolution, and the box would receive twenty-five matches.

The mixture-tank, section II, Figs. 18, 19, and 20, is constructed as follows: A jacketed tank $K'$ is piped for water or steam, or for both. A roll $K^2$, the outside covering of which is of felt or other suitable material, is fast on the shaft $K^3$, which turns in bearings $K^4$ and $K^5$ at either end of the tank $K'$ and is rotated by means of a sprocket-wheel $K^6$ and chain driven by a sprocket-wheel secured to the shaft $E^{26}$, Fig. 1. Below this roll $K^2$, at the bottom of the tank, are located screw-propellers $K^7$ of proper pitch for agitating the igniting mixture. These screw-propellers on shafts $K^{15}$ are revolved by a spur-gear $K^8$ on shaft $K^3$ through the spur-gears $K^9$ and $K^{10}$, shaft $K^{14}$, and beveled gears $K^{11}$, $K^{12}$, and $K^{13}$. The mixture is poured into the end opposite the roll $K^2$ and is kept in a liquid state by the heat from the water or steam and thoroughly mixed and from settling or at an even density by the screw-propellers $K^7$, which keep it moving around and around the tank and also displaces it in a vertical direction. The roll $K^2$ is submerged to a suitable depth and revolves in the mixture, enough adhering to the surface of the roll to form igniting-heads on the match-splints in the conveyer, which passes over it in its circuit of the machine.

Having described my invention, what I claim, and desire to secure by Letters Patent, is as follows:

1. In a match-making machine, the combination of the longitudinally-adjustable match-blank hoppers A, the longitudinally-adjustable side connecting-rods $B^7$, and $B^8$, attached to the match-blank-pushing platen A', the diverging match-splint tubes L, the match-carrier F, its sprocket-wheels and driving-shafts, arranged substantially as shown and described.

2. In a match-making machine, the combination of a main shaft B, the eccentrics $B^5$, and $B^6$, thereon, their eccentric-straps, the length-adjusting connecting side rods $B^7$, and $B^8$, the adjustable match-blank-pushing platen A' connected thereto, the longitudinally-adjustable match-blank hoppers A; substantially as shown, and for the purpose set forth.

3. In a match-making machine, the combination of the longitudinally-adjustable match-blank hoppers A, A, A, A, the hopper-adjusting screws $A^5$, and $A^6$, the lengthwise-adjustable side rods $B^7$, and $B^8$, having adjusting-screws $B^9$, and $B^{10}$, attached thereto, the match-blank-pushing platen A' attached adjustably to the connecting-rods $B^7$, and $B^8$, the adjustable connecting side rods, the eccentrics $B^5$, and $B^6$, and main shaft B, substantially as shown and described.

4. In a match-making machine, a conveyer F, composed of two chains parallel to each other, the inner link F', of each chain having pendent arms $F^2$, the opposing chains having fixed separator-rods $F^3$, and $F^4$, attached to the pendent arms $F^2$, and carrying fixed match-splint holders $F^5$, said holders having parallel openings $F^6$ to receive match-splints, each splint-opening having a spring-opening $F^7$, and each spring-opening having its individual splint-spring $F^8$; substantially as arranged and described.

5. In a match-making machine, the combination of the horizontally-moving conveyer F, having vertical match-holders $F^5$, the ejector-bar $G^{13}$, at right angles thereto, having vertical ejectors, $G^{14}$, the straight cross-bar $G^{16}$, beneath and parallel to the lines of matches in the conveyer, the chutes $G^{15}$, attached to the straight cross-bar, vertically parallel to each other and horizontally in a straight line transverse to the movement of the match-conveyer, the trays $G^{17}$, in a straight line below the chutes, having flaps $G^{18}$, and $G^{19}$, all in the same plane, the flap-rods $G^{22}$, and $G^{23}$, extending through all of the trays and attached to the flaps and parallel to each other and to the lines of matches in the conveyer, the gears $G^{21}$, racks $G^{20}$, the cam $G^{24}$, and cam-rod $G^{25}$, for operating the flaps; substantially as arranged and described.

6. In a match-making machine for the purpose of boxing matches, in combination, the horizontal (at the point of delivering finished match-splints) conveyer F, the vertical (at the time of delivering finished match-splints) individual match-splint holders $F^5$, each holder having an individual match-splint spring $F^8$, the vertically-arranged splint-ejectors $G^{14}$, the curved match-splint receiving and delivering chute $G^{15}$, below the ejectors, the match-splint-receiving flaps $G^{18}$ and $G^{19}$, the flap-operating rods $G^{22}$ and $G^{23}$, arranged substantially as described and for the purpose set forth.

7. In a match-making machine, in combination, the main driving-shaft B, the intermittently-moving sprocket-wheels, the match-conveyer F, having match-holders $F^5$, individual match-splint-retaining springs $F^8$, the vertically-moving match-splint ejectors for pushing finished match-splints from the conveyer, the vertically-moving ejector-holding bar $G^{13}$, its operating mechanism, the match receiving and delivering chute, the match-receiving flaps, the flap-operating rods, arranged substantially as shown and described.

8. In a match-making machine, the sprocket-wheels $D^{25}$, and $D^{24}$, the elevated sprocket-wheels $D^{23}$, and $D^{22}$, all placed horizontally to each other, the sprocket-wheels $D^{21}$, $D^{20}$, $D^7$, $D^8$, all driven by the main shaft B, the conveyer F carried by these sprocket-wheels, the horizontal supporting-guide $G^{31}$, for supporting the conveyer between sprocket-wheels $D^{24}$, and $D^{25}$, the match-ejector $G^{13}$, the box-carrying table H', with its guides $H^2$, the push-bar $H^3$, the revolving index-wheel $H^9$, and its connections to the push-bar $H^3$; all arranged substantially as shown and described.

9. In a match-making machine, for the purpose of counting matches, the combination of the vertical driving-shaft G' and horizontal shaft $H^8$, geared together for driving index-wheel $H^9$, having a series of changeable driving-pins $H^{10}$, for moving the lever $H^{11}$, which oscillates on the pin $H^{16}$, the connecting-rod $H^{13}$, the match-box-push bar $H^3$, the table H', and the guides $H^2$; arranged substantially as shown and described.

10. In a match-making machine, the combination of the match-box-supporting table H', the box-guide strips $H^2$, parallel to the travel of the conveyer F, the box-push bar $H^3$, connected to the lever $H^{11}$, the pin $H^{10}$, the variable index-wheel $H^9$, geared to the driving-shaft G', arranged substantially as and for the purpose set forth.

11. In a match-making machine, the combination of a match-conveyer F and a match-box table H', in different planes, with box-guides $H^2$, on the table, extending parallel with the line of movement of the match-conveyer F, the push-bar $H^3$, the index-wheel $H^9$, the shaft G' and intermediate connecting parts; substantially as shown and described.

12. In a match-making machine, the combination of a conveyer F, as constructed, the igniting-mixture tank K', the mixture-carrying roll $K^2$, the mixing and mixture raising screw-propellers $K^7$, their vertical shafts $K^{15}$, the beveled gears $K^{11}$, $K^{12}$, $K^{13}$, the shaft $K^{14}$, and the speeding spur-gears, $K^8$, $K^9$, and $K^{10}$, the driving-wheel $K^6$, arranged substantially as shown and described.

13. In a match-making machine, in an igniting-mixture tank K', for the purpose of agitating the mixture, the combination of the screw-propeller wheels $K^7$, propeller-wheel shafts $K^{15}$, bevel-gears $K^{11}$, $K^{12}$, and $K^{13}$, shaft $K^{14}$, driving-shaft $K^3$, driving-wheel $K^6$, substantially as shown and described.

14. In a match-making machine, in an igniting-mixture tank $K'$, the combination of the roll $K^2$, the mixing screw-propellers $K^7$, the propeller-shafts $K^{15}$, the bevel-gears $K^{11}$, $K^{12}$, $K^{13}$, the shaft $K^{14}$, and the driving-gears $K^8$, $K^9$, and $K^{10}$; substantially as shown and described.

15. In a match making and boxing machine, the combination of the main shaft B, the lengthwise-adjustable connecting side rods $B^7$ and $B^8$, their connections to the main shaft B, the longitudinally-adjustable match-blank-pushing platen $A'$, its connecting and adjusting mechanism to side rods, the longitudinally-adjustable match-blank hoppers A, the hopper-adjusting screws $A^5$ and $A^6$ connected to each other, the arbor $C'$ carrying saws or dividers C, the diverging match-splint tubes L, the match-splint conveyer F, its sprocket-wheels and driving-shafts, the finished-match ejectors $G^{14}$, in bar $G^{13}$, its connecting mechanism to shaft $G'$, the match-splint chutes $G^{15}$, below ejectors $G^{14}$, the match-receiving trays $G^{17}$ below the chutes $G^{15}$, the flaps $G^{18}$ and $G^{19}$, the flap-rods $G^{22}$ and $G^{23}$, the match-box supporting and guiding table $H'$ parallel to the horizontal line of movement of the match-conveyer F, arranged substantially as shown and described.

CHARLES CARR.

Witnesses:
CHARLES L. ELLIS,
F. M. HOOPER.